US012577425B2

(12) United States Patent
Sohn et al.

(10) Patent No.: US 12,577,425 B2
(45) Date of Patent: Mar. 17, 2026

(54) ANTIBACTERIAL POLYMER COMPOSITION COMPRISING POLYMER COMPOUND OBTAINED BY GRAFT POLYMERIZING CATIONIC MONOMER AND FLUORINE-BASED ACRYLIC MONOMER TO FLUORINE-BASED COPOLYMER

(71) Applicant: KOREA RESEARCH INSTITUTE OF CHEMICAL TECHNOLOGY, Daejeon (KR)

(72) Inventors: Eun Ho Sohn, Daejeon (KR); Dong Je Han, Daejeon (KR); Ju Hyeon Kim, Daejeon (KR); Won Wook So, Daejeon (KR); In Joon Park, Daejeon (KR); Bong Jun Chang, Daejeon (KR); Ji Hoon Baik, Daejeon (KR); Myoung Sook Lee, Daejeon (KR); Sang Goo Lee, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 18/850,997

(22) PCT Filed: Apr. 27, 2023

(86) PCT No.: PCT/KR2023/005758

§ 371 (c)(1),
(2) Date: Sep. 25, 2024

(87) PCT Pub. No.: WO2023/211184

PCT Pub. Date: Nov. 2, 2023

(65) Prior Publication Data

US 2025/0223459 A1 Jul. 10, 2025

(30) Foreign Application Priority Data

Apr. 29, 2022 (KR) ........................ 10-2022-0053257

(51) Int. Cl.

| | |
|---|---|
| ***C09D 127/16*** | (2006.01) |
| ***C08F 259/08*** | (2006.01) |
| ***C08L 51/00*** | (2006.01) |
| ***C09D 5/14*** | (2006.01) |
| ***C09D 133/16*** | (2006.01) |
| ***C09D 151/00*** | (2006.01) |

(52) U.S. Cl.
CPC ............. *C09D 127/16* (2013.01); *C09D 5/14* (2013.01); *C09D 133/16* (2013.01); *C09D 151/003* (2013.01); *C08F 259/08* (2013.01); *C08L 51/003* (2013.01)

(58) Field of Classification Search
CPC .... C08F 259/08; C08F 259/02; C08F 214/22; C08F 214/24; C09D 151/003; C09D 127/16; C09D 133/16; C08L 24/24; C08L 51/06
See application file for complete search history.

(56) References Cited

U.S. PATENT DOCUMENTS

2004/0063805 A1* 4/2004 Pacetti .................... A61L 31/10
427/2.24

FOREIGN PATENT DOCUMENTS

| | | |
|---|---|---|
| JP | 05-058825 A | 3/1993 |
| KR | 10-2012-0027176 A | 3/2012 |
| KR | 10-2020-0078720 A | 7/2020 |
| KR | 10-2021-0052258 | 5/2021 |
| WO | WO 2008-009865 A1 | 1/2008 |

OTHER PUBLICATIONS

Shen et al. ACS Omega. vol. 3 pp. 17403-17415 (Year: 2018).*
Han et al, Applied Polymer Materials vol. 2 pp. 178-188 (Year: 2020).*
Ma et al, Journal of Membrane Science vol. 620 (Year: 2021).*
WO2008009865 machine translation (Year: 2025).*
International Search Report and Written Opinion for corresponding PCT Application No. PCT/KR2023/005758, mailed Aug. 7, 2023.
Han, D. J. et al. (2021) "Poly(vinylidene fluoride)-based film with strong antimicrobial activity", Applied Surface Science 562, thesis No. 150181, inner pp. 1-9.

* cited by examiner

*Primary Examiner* — Jeffrey S Lenihan
(74) *Attorney, Agent, or Firm* — LEYDIG, VOIT & MAYER, LTD.

(57) ABSTRACT

The present invention relates to an antibacterial polymer composition containing a polymer compound in which a cationic monomer and a fluorine-based acrylic monomer are graft-polymerized in a fluorine-based copolymer. A fluorine-based polymer composition according to the present specification exhibits an antibacterial effect of 99.9% or more, exhibits a contact angle of 150 degrees or greater with respect to a solvent, and thus can be applied to a coating agent exhibiting high air permeability, contamination resistance, and antibacterial effect.

15 Claims, 5 Drawing Sheets

| | |
|---|---|
| ▨ | Spray Nozzle |
| ●◐ꞁ | Polymer Solution |
| ꞁ | Polymer |
| ▨ | Substrate |

50 μm

PVDF-CTFE

PVDF-QDMA

ANTIBACTERIAL POLYMER COMPOSITION COMPRISING POLYMER COMPOUND OBTAINED BY GRAFT POLYMERIZING CATIONIC MONOMER AND FLUORINE-BASED ACRYLIC MONOMER TO FLUORINE-BASED COPOLYMER

CROSS-REFERENCE TO RELATED APPLICATIONS

This application is a U.S. National Stage Application filed under 35 U.S.C. § 371 of International Application No. PCT/KR2023/005758, filed Apr. 27, 2022, which claims the benefit of Korean Application No. 10-2022-0053257, filed Apr. 29, 2022. Both of these applications are incorporated herein by reference.

TECHNICAL FIELD

The present invention relates to an antibacterial polymer composition containing a polymer compound in which cationic monomer and fluorine-based acrylic monomer are graft-polymerized in a fluorine-based copolymer.

BACKGROUND ART

As a hygienic life is actively required in daily life, antibacterial agents are being used in various fields. A lot of products having antibacterial functions have been developed and applied in various fields in which it is required to prevent bacterial contamination in industry and the environment, for example, various household items such as storage containers for food, beverages, or cosmetics, toothbrushes, stationery, home appliances, and bedding, and construction materials. In a case of making, with a polymeric antibacterial material that is easily processable, daily life items related to human food, clothing, and shelter of humans, as well as interior materials for a public telephone, a public restroom, a subway, and a bus, which are used by many people, the living environment can become more hygienic and safer, and thus there is a demand for an antibacterial polymer material for a coating material having excellent processability. Generally known antibacterial polymer materials provide performance at a level in which an antifouling function is maintained and bacterial proliferation is inhibited, and thus they have a problem in that it is difficult to use them for a long period of time since there is a high possibility that bacteria will proliferate as time elapses.

On the other hand, as an organic antibacterial agent that exhibits antibacterial properties, a quaternary ammonium salt, a pyridine compound, an organic halogen compound, a thiazoline compound, phenols, and the like are generally known. A compound, which exhibits cationic properties which are obtained by combining functional groups of these compounds in a complex manner, may exhibit antibacterial properties.

In previous research, an antibacterial polymer (PVDF-QDMA) was developed by subjecting an acrylic monomer containing a quaternary ammonium group to graft polymerization with polyvinylidene fluoride-co-chlorotrifluoroethylene (PVDF-co-CTFE) (Patent Document: Korean Patent Laid-open No. 10-2021-005258). It was shown that antibacterial properties are exhibited due to the electrostatic reaction between the antibacterial part in the polymer and the bacteria, and the contact-killing effect, and through this, a strong sterilizing power is provided against all of the gram-positive bacteria, the gram-negative bacteria, and the fungi. However, due to the hydrophilic ammonium group contained in the polymer, the water contact angle was about 80 degrees, and thus the contamination resistance was not high.

In the present invention, a quaternary ammonium-containing acrylic monomer and a fluorine-based acrylic monomer were together subjected to graft polymerization with a VDF-based polymer to realize excellent antibacterial properties, as well as good solubility in a general-purpose organic solvent and characteristics of super water repellency/super oleophobicity. In addition, the present invention provides a multi-functional quarantine mask as a utilization example of such antibacterial and contamination resistance coating.

DISCLOSURE OF THE INVENTION

Technical Problem

One object of the present invention is to provide an antibacterial polymer composition.

Another object of the present invention is to provide a production method for antibacterial polymer composition.

Still another object of the present invention is to provide a coating agent containing a polymer compound.

Even another object of the present invention is to provide a spray coating method for an antibacterial polymer composition.

Technical Solution

In order to achieve the above objects, according to one aspect of the present invention, there is provided an antibacterial polymer composition containing a polymer compound obtained by subjecting a cationic monomer containing a vinyl group and a quaternary ammonium group and a fluorine-based acrylic monomer to graft polymerization with polyvinylidene fluoride-co-chlorotrifluoroethylene (PVDF-co-CTFE).

According to another aspect of the present invention, there is provided a production method for an antibacterial polymer composition, which includes a step of producing a polymerization solution containing polyvinylidene fluoride-co-chlorotrifluoroethylene (PVDF-co-CTFE), a cationic monomer containing a vinyl group and a quaternary ammonium group, a fluorine-based acrylic monomer, a metal catalyst, a ligand, and a polar aprotic solvent (step 1); and a step of carrying out a polymerization reaction using the polymerization solution to produce a polymer compound that is obtained by subjecting a cationic monomer and a fluorine-based acrylic monomer to graft polymerization (step 2).

According to still another aspect of the present invention, there is provided a coating agent containing a polymer compound obtained by subjecting a cationic monomer containing a vinyl group and a quaternary ammonium group and a fluorine-based acrylic monomer to graft polymerization with polyvinylidene fluoride-co-chlorotrifluoroethylene (PVDF-co-CTFE).

According to even still aspect of the present invention, there is provided a spray coating method for an antibacterial polymer composition, the spray coating method including a step of dissolving the antibacterial polymer composition according to claim 1 in an organic solvent (step 1') and a step of spraying the dissolved solution (step 2').

Advantageous Effects

A fluorine-based polymer composition according to the present specification exhibits an antibacterial effect of 99.9% or more, exhibits a contact angle of 150° or more with respect to a solvent, and thus can be applied to a coating agent exhibiting high air permeability, contamination resistance, and antibacterial effect.

MODE FOR CARRYING OUT THE INVENTION

Figure 1:
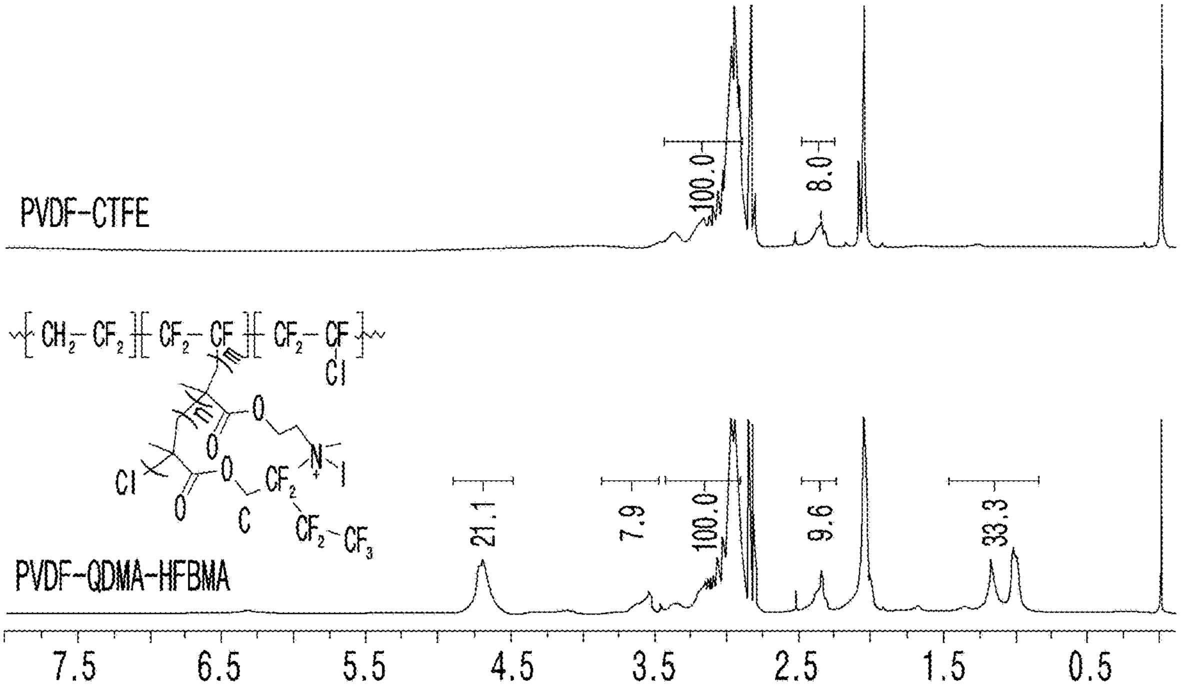
FIG. 1 shows graphs obtained by analyzing a polymer compound according to one embodiment by using nuclear magnetic resonance spectroscopy (NMR).

Hereinafter, the present invention will be described in detail.

On the other hand, the embodiments of the present invention may be modified into various other forms, and thus the scope of the present invention is not limited to the embodiments described below. In addition, the embodiments of the present invention are provided to more completely describe the present invention to those skilled in the related art.

Further, throughout the specification, "including" a certain constitutional element means that other elements may be further included rather than excluding other elements, unless specified otherwise.

The term "alkyl" includes a linear or branched saturated hydrocarbon residue unless otherwise specified. For example, "$C_{1-10}$ alkyl" means an alkyl having a skeleton consisting of 1 to 10 carbon atoms. Specifically, $C_{1-4}$ alkyl may include methyl, ethyl, n-propyl, i-propyl, n-butyl, i-butyl, t-butyl, and the like.

According to one aspect of the present invention, there is provided an antibacterial polymer composition containing a polymer compound obtained by subjecting a cationic monomer containing a vinyl group and a quaternary ammonium group and a fluorine-based acrylic monomer to graft polymerization with polyvinylidene fluoride-co-chlorotrifluoroethylene (PVDF-co-CTFE).

The antibacterial polymer composition is such as one that contains a polymer compound obtained by subjecting a cationic monomer containing a vinyl group and a quaternary ammonium group to graft polymerization with PVDF-co-CTFE, and the PVDF-co-CTFE may be represented by Chemical Formula 1.

[Chemical Formula 1]

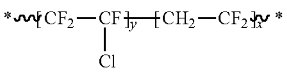

in Chemical Formula 1, x is 73 to 98; and y is 2 to 27.

The content of chlorotrifluoroethylene (CTFE) in the PVDF-co-CTFE is desirably 4% to 40% by weight, more desirably 9% to 31% by weight, and most desirably 13% to 20% by weight. In a case where the content of CTFE in the PVDF-co-CTFE is less than 4% by weight, there is a problem that the graft rate of the cationic polymer is low, which reduces antibacterial properties, and at the same time, the number of chloride groups is small, which reduces the processability of the coating material. In a case where the content thereof is more than 40% by weight, there is a problem that a material formed from the polymer composition has insufficient physical properties.

The cationic monomer is a monomer containing a vinyl group capable of undergoing graft polymerization and a quaternary ammonium group, and the quaternary ammonium group may be a quaternary alkylammonium group, a pyridinium group, or an imidazolium group.

The cationic monomer may be a monomer which is produced by subjecting a monomer to a reaction for a quaternary ammonium, the monomer being one or more among 2-dimethylaminoethyl methacrylate, 3-dimethylaminopropyl methacrylate, 2-vinylpyridine, and 4-vinylpyridine, and desirably, it may be 2-methacryloyloxy ethyl trimethylammonium iodide which is produced by subjecting a 2-dimethylaminoethyl methacrylate monomer to a reaction for a quaternary ammonium.

For example, the cationic monomer may be a compound of Chemical Formula 2 below.

[Chemical Formula 2]

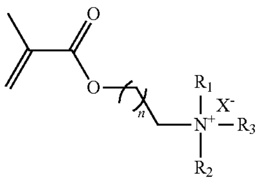

In Chemical Formula 2, $R_1$ to $R_3$ are each independently $C\text{-}_{1-4}$ alkyl;

X is $Cl^-$, $Br^-$, $I^-$, $AlCl_4^-$, $Al_2Cl_7^-$, $BF_4^-$, $PF_6^-$, $ClO_4^-$, $NO_3^-$; $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $(CN)_2N^-$, $C_4F_9SO_3^-$, $(C_2F_5SO_2)_2N^-$, $C_3F_7COO^-$, or $(CF_3SO_2)(CF_3CO)N^-$; and n is 1 to 3.

As a specific example, the polymer compound may be a compound represented by Chemical Formula 3.

[Chemical Formula 3]

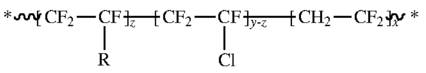

In Chemical Formula 3,

R is such as one that is obtained by subjecting a cationic monomer containing a vinyl group and a quaternary ammonium group and a fluorine-based acrylic monomer to graft polymerization;

x is 73 to 98;

y is 2 to 27; and z is 0.6 to 16.

The fluorine-based acrylic monomer may be a methacrylic acid ester monomer in which 3 or more hydrogen atoms are substituted with a fluorine atom or 5 or more hydrogen atoms may be substituted with a fluorine atom, and desirably, it is a methacrylic acid ester in which 7 hydrogen atoms are substituted with a fluorine atom.

As an example, the fluorine-based acrylic monomer may be selected from the group consisting of trifluoroethyl methacrylate, tetrafluoropropyl methacrylate, octafluoropentyl methacrylate, tetrafluoroethyl methacrylate, hexafluorobutyl methacrylate, and heptafluorobutyl methacrylate, and desirably, it may be heptafluorobutyl methacrylate (HpFBMA).

The graft rate of the polymer compound is calculated according to Expression 1 below, and it is desirably 10% by weight to 70% by weight, more desirably 20% to 65% by weight, and most desirably 25% to 60% by weight. In a case where a cationic monomer and a fluorine-based acrylic monomer are grafted at a graft rate in the above range, it is possible to provide excellent mechanical characteristics and at the same time exhibit excellent antibacterial characteristics and superhydrophobicity, and in particular, it is possible to exhibit bacterial killing characteristics.

<Expression 1>

$$\text{Graft rate (\%)} = \frac{\text{Weights of cationic monomer and fluorine-based acrylic monomer which have been subjected to graft polymerization}}{\text{Total weight of polymer compound}} \times 100$$

In the polymer compound, the content ratio between the cationic monomer and the fluorine-based acrylic monomer, which have been subjected to graft polymerization, may be 4% by weight: 96% by weight to 80% by weight: 20% by weight, and desirably, it may be 4% by weight: 96% by weight to 40% by weight: 60% by weight or may be 8% by weight: 92% by weight to 20% by weight: 80% by weight.

According to another aspect of the present invention, there is provided a production method for an antibacterial polymer composition, which includes:

a step of producing a polymerization solution containing polyvinylidene fluoride-co-chlorotrifluoroethylene (PVDF-co-CTFE), a cationic monomer containing a vinyl group and a quaternary ammonium group, a fluorine-based acrylic monomer, a metal catalyst, a ligand, and a polar aprotic solvent (step 1); and a step of carrying out a polymerization reaction using the polymerization solution to produce a polymer compound that is obtained by subjecting a cationic monomer and a fluorine-based acrylic monomer to graft polymerization (step 2).

Hereinafter, the production method for an antibacterial polymer composition, which is provided according to another aspect of the present invention, will be described in detail according to each step.

First, the step 1 is a step of producing a polymerization solution containing PVDF-co-CTFE to be used as a macroinitiator, a cationic monomer and a fluorine-based acrylic monomer which are for imparting functionality, a metal catalyst, ligand, and a polar aprotic solvent capable of dissolving these.

Since the PVDF-co-CTFE, the cationic monomer, and the fluorine-based acrylic monomer are the same as those described in the antibacterial polymer composition, a detailed description thereof will be omitted below.

It is desirable to use a monovalent copper metal catalyst as the metal catalyst. It is possible to use a monovalent copper chloride or monovalent copper bromide, and it is desirable to monovalent copper chloride.

As the ligand, it is possible to use 2,2-bipyridine, pentamethyldiethylenetriamine, 4,4-dimethyldipyridyl, or the like, which can form a mixture with a monovalent copper ion, and it is desirable to use liquid pentamethyldiethylenetriamine.

Since the polar aprotic solvent needs to dissolve a vinylidene fluoride-based copolymer that is used as a macroinitiator, and a cationic monomer, it is desirable to use a polar aprotic solvent such as dimethyl sulfoxide, N-methyl 2-pyrrolidone, or dimethylformamide, and the above-described solution can be used without particular restrictions on the concentration; however, the concentration thereof is desirably 20% by weight.

In addition, the content of PVDF-co-CTFE in the polymerization solution is desirably 5% to 10% by weight with respect to the total weight of the polymer compound, the content of the cationic monomer is 2% to 8% by weight with respect to the total weight of the polymer compound, and the content of the fluorine-based acrylic monomer is desirably 5% to 10% by weight with respect to the total weight of the polymer compound.

Next, the step 2 is a step of carrying out a polymerization reaction using the polymerization solution to produce a polymer compound that is obtained by subjecting a cationic monomer and a fluorine-based acrylic monomer to graft polymerization.

In the step 2, a polymerization reaction is carried out using the polymerization solution prepared in the step 1.

As a specific example, the polymerization reaction may be carried out in an inert atmosphere in a temperature range of 60° C. to 120° C., a temperature range of 70° C. to 110° C., or a temperature range of 80° C. to 100° C., and at a stirring speed of 300 rpm to 600 rpm, or a stirring speed of 350 rpm to 500 rpm.

According to another aspect of the present invention, there is provided a coating agent containing a polymer compound obtained by a graft polymerization of a cationic monomer containing a vinyl group and a quaternary ammonium group and a fluorine-based acrylic monomer with polyvinylidene fluoride-co-chlorotrifluoroethylene (PVDF-co-CTFE).

The coating agent containing a polymer compound, which is provided in the present invention, exhibits excellent antibacterial properties just by the polymer compound itself and thus can be applied as an antibacterial coating material that requires high performance and stability.

Furthermore, since the coating agent further contains a fluorine-based acrylic monomer, it has a high solubility in a low boiling point solvent and thus exhibits superhydrophobicity.

Regarding the coating agent, any coating method can be used without particular limitation as long as it is a method that can coat a substrate with the coating agent; however, spin coating, dip coating, roll coating, solution coating, spray coating, or the like is desirable, and spray coating is more desirable.

The spray coating is a technique that sprays a solution, in which solid content is dissolved or dispersed in a solvent, together with compressed gas through a nozzle to spray the solution onto a base material, and it is a technique that is practically used in the industry. The sprayed solution is ejected from the nozzle in the form of fine particles, and the solvent evaporates while or after arriving at the base material, leaving solid content on the base material. The sprayed fine particles have a surface area that is significantly increased as compared with the surface area in a case where they are aggregated together, and in a case where the solvent is a low boiling point solvent that evaporates quickly, the solvent evaporates instantly before reaching the base material.

According to still another aspect of the present invention, there is provided a spray coating method for an antibacterial polymer composition, the spray coating method including a step of dissolving the antibacterial polymer composition in an organic solvent (step 1') and a step of spraying the dissolved solution (step 2').

Figure 2:
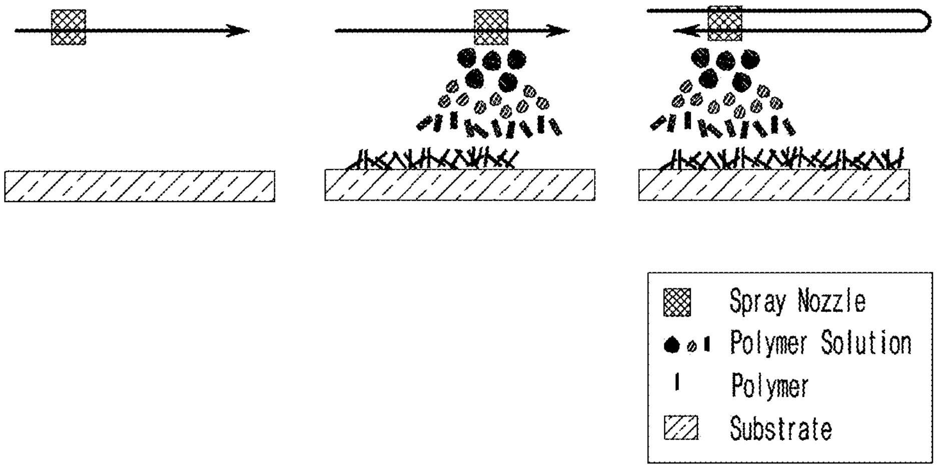
FIG. 2 shows a schematic view of a spray coating method according to one embodiment.

Hereinafter, the spray coating method for an antibacterial polymer composition, which is provided according to another aspect of the present invention, will be described in detail according to each step. The schematic view is as shown in FIG. 2.

First, the step 1' is a step of dissolving, in an organic solvent, the polymer composition produced according to the above-described production method for an antibacterial polymer composition.

For spray coating, the organic solvent is not limited as long as it is a low boiling point solvent that is capable of dissolving a polymer. Considering the vapor pressure and the boiling point of the solvent, acetone, methyl ethyl ketone (MEK), methyl acetate, methylene chloride, benzene, methyl alcohol, tetrahydrofuran, or the like may be used. Considering the effects of organic solvents on the human body and the environment, methyl acetate, acetone, or methyl ethyl ketone is desirable as a solvent. More desirably, methyl ethyl ketone can be used.

Next, the step 2' is a step of spraying the dissolved solution.

Variables that can be adjusted in the step of carrying out spraying according to the step 2 include a nozzle spray interval, a nozzle movement speed, a nozzle air pressure, a solution discharge speed, a test piece temperature, a nozzle-test piece distance, and the like. Variables that can be adjusted in the nozzle include the diameter of the nozzle outlet, the form of the gas outlet, or the like. Variables that can be adjusted in a solution include the viscosity of the solution, the evaporation rate of the solution, and the like.

MODE FOR CARRYING OUT THE INVENTION

Hereinafter, the present invention will be described in detail through examples and experimental examples.

However, the examples and experimental examples described below are merely shown to specifically describe exemplarily the present invention in terms of one aspect, and thus the present invention is not limited thereto.

<Example 1> Production of Antibacterial Polymer Composition (PVDF-HpFBMA-QDMA)

Step 1: A solution was made from 30 g of a copolymer of vinylidene fluoride and chlorotrifluoroethylene, 500 g of dimethyl sulfoxide, 30 g of a fluorine-based methacrylic monomer HpFBMA (heptafluorobutyl methacrylate), 20 g of a cationic monomer (QDMA, 2-(methacryloyloxyethyl) trimethylammonium iodide), 1 g of monovalent copper chloride, and 2.0 ml of pentamethyldiethylenetriamine.

Step 2: Thereafter, the solution was subjected to polymerization while being stirred at a temperature of 95° C. in air and a stirring speed of 500 rpm, and then the cationic monomer was grafted onto about 50 g of vinylidene fluoride-based copolymer to produce an antibacterial polymer in which 39% by weight of HpFBMA and 4% by weight of QDMA are grafted onto PVDF-co-CTFE.

The composition of a fluorine-based cationic acrylic copolymer, which had been obtained through nuclear magnetic resonance spectroscopy (NMR) using neutronized acetone as a solvent, was checked through the peak integration ratio, which is shown in FIG. 1. In a case of a representative sample, the monomer composition ratio (% by mole) obtained through 1H-NMR peak integration was HpFBMA:QDMA=92:8.

<Example 2> Spray Coating Using Low Boiling Point Solvent

The following experiment was carried out to check the spray coating performance of the antibacterial polymer composition according to the present invention. FIG. 2 shows a schematic view of the spray coating carried out in this example.

Specifically, 10% by weight of the antibacterial polymer produced in Example 1 was dissolved in each of methyl ethyl ketone (MEK) and acetone to make the coating solution below, and spray coating was carried out as shown in FIG. 2 by using the fixed variables below and together with the spray coating process conditions in Table 1 below as control variables. In this case, the solvent to be used for coating is not particularly limited as long as it is a low boiling point solvent that can dissolve the polymer. However, methyl ethyl ketone or acetone was used as a solvent since the polymer of Example 1 showed favorable solubility, particularly in a ketone-based solvent.

<Control Variable>

TABLE 1

| Coating condition name | Nozzle movement speed [mm/min] | Solution discharge speed [ml/min] | Test piece temperature [° C.] | Solution concentration [%] | Nozzle air pressure [kPa] |
|---|---|---|---|---|---|
| A | 10 | 1 | 27 | 10 | 2 |
| B | 15 | 1 | 27 | 10 | 2 |
| C | 20 | 1 | 27 | 10 | 2 |
| D | 15 | 0.5 | 27 | 10 | 2 |
| E | 15 | 1 | 27 | 10 | 4 |
| F | 15 | 1 | 27 | 10 | 1 |
| G | 15 | 1.5 | 27 | 10 | 2 |
| H | 15 | 1 | 60 | 10 | 2 |
| I | 15 | 1 | 100 | 10 | 2 |

TABLE 1-continued

| Coating condition name | Nozzle movement speed [mm/min] | Solution discharge speed [ml/min] | Test piece temperature [° C.] | Solution concen-tration [%] | Nozzle air pressure [kPa] |
|---|---|---|---|---|---|
| J | 15 | 1 | 27 | 7.5 | 2 |
| K | 15 | 1 | 27 | 7.5 | 4 |

<Fixed Variable>

The nozzle spray interval was fixed at 5 mm, the distance between the nozzle and the test piece was fixed at 15 cm, and the nozzle used was an AM6 nozzle manufactured by ATOMAX Co., Ltd. The coating was carried out twice on a 2 cm×2 cm silicon wafer chip, and the interval between coatings was 1 minute.

<Comparative Example 1> Production of Polymer Composition (PVDF-QDMA)

Step 1:2.0 g of polyvinylidene fluoride-co-chlorotrifluoroethylene (PVDF-co-CTFE), 6.0 g of (QDMA, 2-(methacryloyloxyethyl)trimethylammonium iodide), 0.3 g of monovalent copper chloride, and 0.63 ml of pentamethyldiethylenetriamine were with 60 ml of dimethyl sulfoxide to prepare a polymerization solution.

Step 2: The polymerization solution prepared in the step 1 was subjected to a polymerization reaction at a temperature of 90° C. in air and a stirring speed of 350 to 500 rpm to produce a polymer compound in which 35% by weight of QDMA is grafted onto PVDF-co-CTFE.

<Comparative Example 2> Production of Polymer Composition (PVDF-HFBMA)

Step 1: A solution was made from 12 g of a copolymer of vinylidene fluoride and chlorotrifluoroethylene, 250 g of N-methyl 2-pyrrolidone, 20 g of a fluorine-based methacrylic monomer HpFBMA (heptafluorobutyl methacrylate), 0.4 g of monovalent copper chloride, and 0.6 g of 2,2-bipyridine.

Step 2: Thereafter, the solution was subjected to a polymerization reaction while being stirred at a temperature of 90° C. in air and a stirring speed of 500 rpm, and then the cationic monomer was grafted onto about 20 g of vinylidene fluoride-based copolymer to produce a polymer compound in which 42% by weight of HpFBMA is grafted onto PVDF-co-CTFE.

<Experimental Example 1> Evaluation of Surface Characteristics of Spray Polymer Coating Surface Structure Analysis In order to evaluate the coating surface characteristics of the polymer compound according to one embodiment, spray coating was carried out according to the condition B among the coating conditions in Table 1, and then the surface microstructure was observed with a scanning electron microscope. Among them, the results obtained from a case where methyl ethyl ketone was used as a solvent are shown in FIGS. 3*a* to 3*c*.

Figure 3A:
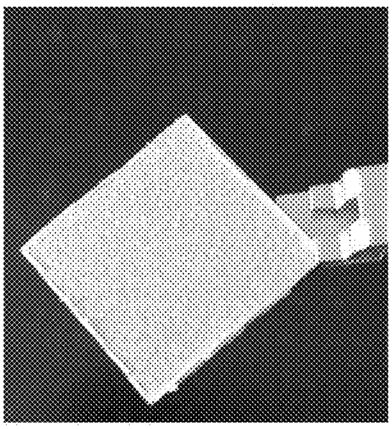
FIG. 3*a* is a photographic image of a test piece obtained by coating a silicon chip with a polymer according to one embodiment.
Figure 3B:
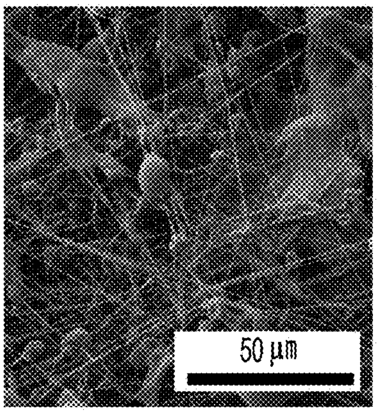
FIG. 3*b* and FIG. 3*c* show a microstructure observed by magnifying and then imaging, through a scanning electron microscope, a test piece obtained by coating a silicon chip with a polymer according to one embodiment.
Figure 3C:
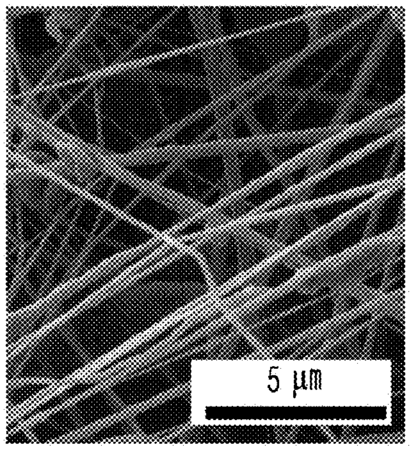

FIG. 3*a* is a photographic image of a test piece obtained by coating a silicon chip with a polymer, and FIG. 3*b* and FIG. 3*c* show a microstructure observed by magnifying at 1,000 and 10,000 times and then imaging a test piece through a scanning electron microscope.

As a result of the analysis, it was confirmed that fibers having a thickness of hundreds of nanometers are well formed, as shown in FIG. 3*b* and FIG. 3*c*, and similar results were obtained in a case where acetone was used as a solvent. Through this, it can be confirmed that the polymer compound according to one embodiment can well form a coating layer with spray coating.

(2) Contact Angle Analysis (1)

In order to evaluate the coating surface characteristics of the polymer compound according to one embodiment, 10% by weight of the polymer compound of Example 1 was dissolved in methyl ethyl ketone (MEK) to make a coating solution, spray coating was carried out on a silicon chip according to the conditions shown in Table 1 above, and the contact angle of each of water and diiodomethane (DIM) on the coated surface was measured. As a control (indicated as Bare in Table 1), a solution obtained by dissolving PVDF-HpFBMA-QDMA to 2% by weight in dimethylformamide (DMF) was uniformly applied onto the silicon chip by spin coating at 2000 rpm, the solvent was subsequently evaporated, and then the contact angle of water on the coated surface was measured. The results are shown in Table 2 below.

TABLE 2

| Coating condition name | Water contact angle (standard deviation) | DIM angle (standard deviation) |
|---|---|---|
| A | 152.9 (5.3) | 134.5 (5.6) |
| B | 162.67 (2.2) | 147.7 (2.1) |
| C | 148.53 (0.8) | 127.3 (3.9) |
| D | 151.33 (4.7) | 134.8 (2.2) |
| E | 139.54 (2.1) | 90.8 (2.9) |
| F | 141.4 (3.9) | 90.2 (4.3) |
| G | 141.21 (4.8) | 98.3 (7.2) |
| H | 160.0 (2.7) | 126.0 (4.2) |
| I | 147.8 (6.5) | 91.2 (5.5) |
| J | 158.7 (3.8) | 150.1 (0.3) |
| K | 161.3 (1.3) | 148.9 (3.0) |
| Bare (control group) | 104.1 (0.8) | 94.69 (2.0) |

As a result of the analysis, as shown in Table 2, it can be confirmed that mostly water and diiodomethane (DIM) which is an oil component have a significantly higher contact angle as compared with Bare in a case where spray coating is carried out. In particular, very high contact angles could be obtained under the coating conditions B and J, and through this, suitable values could be obtained for the nozzle movement speed, the solution discharge speed, the test piece temperature, and the nozzle air pressure.

(3) Contact Angle Analysis (2)

In order to compare the coating surface characteristics of the polymer compound according to one embodiment with the coating surface characteristics of the polymer compound of the comparative example, as a comparison example, a coating solution in which PVDF-co-CTFE which is a polymer compound that does not contain a fluorine-based acrylic monomer, and the polymer compound of Comparative Example 1 (PVDF-co-CTFE-QDMA) were dissolved was made, where the coating solution was made by dissolving 2% by weight of the polymer compound in dimethylformamide (DMF) since the PVDF-co-CTFE and the polymer compound of Comparative Example 1 was not soluble in a low boiling point solvent. Then, spin coating was carried out on a silicon chip at 2,000 rpm, the solvent subsequently evaporated, and then the contact angle of water on the coated surface was measured. The results are shown in Table 3 and FIG. 4*a* and FIG. 4*b*.

TABLE 3

| Polymer compound | Water contact angle(standard deviation) |
|---|---|
| PVDF-co-CTFE | 82.1 |
| Comparative Example 1 (PVDF-QDMA) | 56.5 |

Figure 4A:
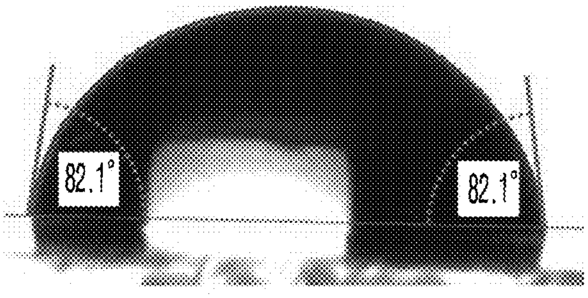
FIG. 4*a* is a photographic image obtained by analyzing the contact angle of a test piece obtained by coating a silicon chip with a PVDF-co-CTFE polymer.
Figure 4B:
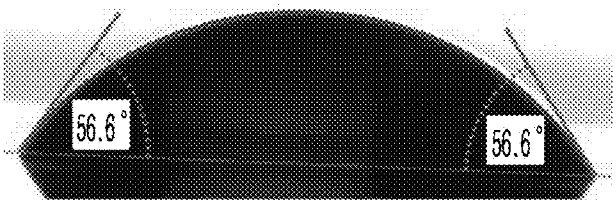
FIG. 4*b* is a photographic image obtained by analyzing the contact angle of a test piece obtained by coating a silicon chip with a PVDF-co-CTFE-QDMA polymer.

As shown in Table 3 and FIG. 4*a* and FIG. 4*b*, it can be confirmed that in cases of PVDF-co-CTFE and Comparative Example 1 (PVDF-co-CTFE-QDMA), the contact angle is significantly lower as compared with the water contact angle in a case where the coating is carried out with the polymer compound of Example 1 under the Bare condition. From the above results, the polymer compound according to one embodiment can be seen to have better water repellency by further containing a fluorine-based acrylic monomer.

<Experimental Example 2> Evaluation of Antibacterial Properties of Spray Polymer Coating To evaluate the antibacterial properties of the spray polymer coating according to Example 2, the experiment was carried out as follows.

As test bacterial strains, *Staphylococcus* ATCC 6538 (*S. aureus*), which is a gram-positive bacterium, *Escherichia* ATCC 8739 (*E. coli*), which is a gram-negative bacterium, and *Candida* ATCC 10231 (*C. albicans*), which is a fungus, were used. Bacteria were inoculated on Nutrient Agar (NA) and pre-cultured at 35° C. for 1 day, and yeast was inoculated on Potato Dextrose Agar (PDA) at 25° C. for 2 days, and then they were diluted in a sterile physiological saline to prepare bacterial solutions of 106/ml.

After placing a specimen on the bottom of a petri dish, the specimen is subjected to inoculation with 0.4 ml of each of the bacterial solutions. A sterilization film is covered thereon, and then incubation is carried out at 35° C. for 24 hours. After the culture is completed, 10 ml of each of the culture media is aliquoted and homogenized, and then the number of bacteria is measured. Four independent culture experiments were carried out for each sample, and then antibacterial performance was evaluated by comparing the number of bacteria before and after culture.

Control indicates the results of the antibacterial test on a sterilized polymer film, and N95 Mask indicates the results of the antibacterial test on a mask raw fabric without being subjected to spray coating. In addition, Coated N95 Mask indicates the results of the antibacterial test on a sample which was obtained by subjecting an N95 raw fabric to spray coating under the condition B described above.

Regarding the experiment results, the results are shown in Table 4, where 0 h indicates the number of bacteria at the start of the test, and 24 h indicates the number of bacteria at the end of the test. From Table 4, it can be seen that the sample that has been subjected to spray coating has very strong antibacterial properties. It was confirmed that more than 99.98% of bacteria have died after 24 hours.

TABLE 4

| | *S. aureus* | | *E. coli* | | *C. albicans* | |
|---|---|---|---|---|---|---|
| Unit: CFU/ml | 0 h | 24 h | 0 h | 24 h | 0 h | 24 h |
| Control | $1.1 \times 10^5$ | $1.7 \times 10^4$ | $1.9 \times 10^5$ | $1.5 \times 10^5$ | $1.4 \times 10^5$ | $4.1 \times 10^4$ |
| N95 Mask | | $6.1 \times 10^3$ | | $9.1 \times 10^4$ | | $7.6 \times 10^4$ |
| Coated N95 Mask | | $1 < 10^1$ | | $1 < 10^1$ | | $2.3 \times 10^1$ |

<Experimental Example 3> Evaluation of Mechanical Durability of Spray Polymer Coating In order to evaluate the mechanical abrasion resistance characteristics of the coating, each of the polymer compound of Example 1 and the polymer compound of Comparative Example 2 was applied twice onto a glass slide under the coating condition B in Table 1, and then changes in surface characteristics were measured while applying friction polishing by the following method.

Figure 5:
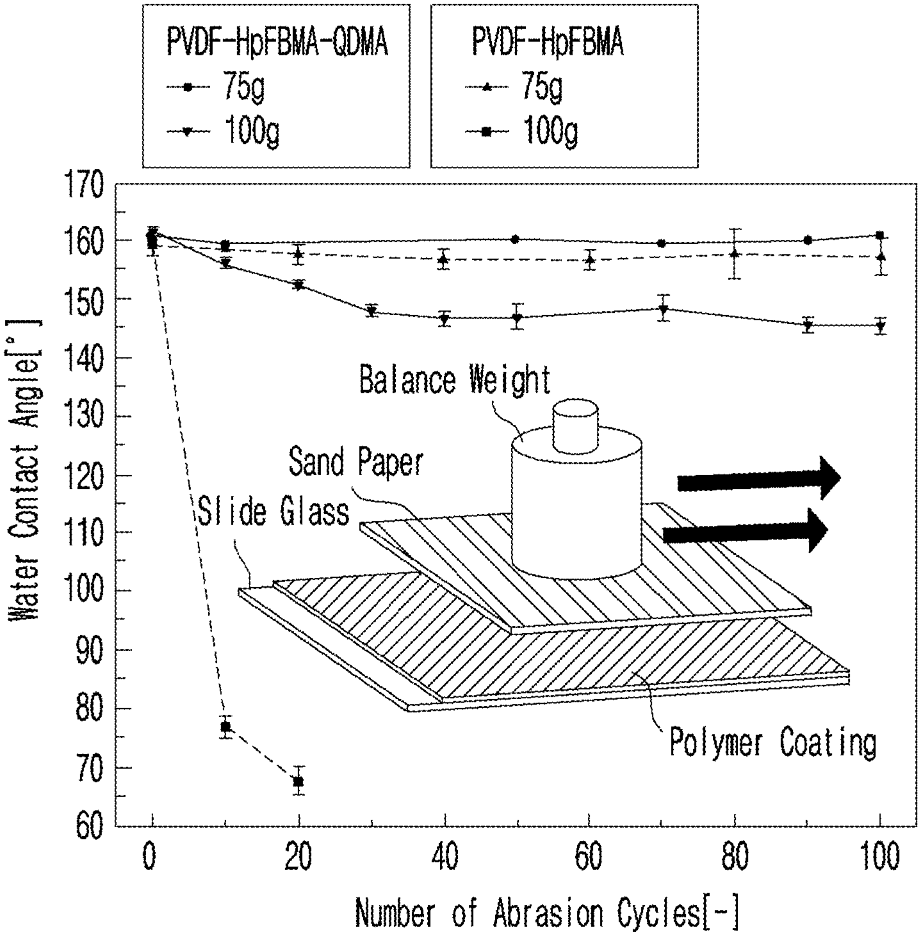
FIG. 5 shows the results obtained by evaluating the mechanical durability of a coating containing a polymer compound according to one embodiment.

Specifically, the coated surface was subjected to a polishing test while applying a load of 75 g and 100 g to a metal polishing sandpaper (3M Sanding Sponge Microfine 1200-1500 Grit, made of an aluminum oxide material), and a change in the water contact angle according to the number of times of polishing was measured, the results of which are shown in FIG. 5 for Example 1.

As shown in Table 5, it was confirmed that in a case of coating using the polymer compound (PVDF-HpFBMA-QDMA) of Example 1, the water contact angle was maintained at about 160 degrees even after polishing was carried out 100 times in a case where a load of 75 g was applied, and although the coating was slightly abrased during the initial 30 polishing cycles and the water contact angle decreased to about 150 degrees in a case where a load of 100 g was applied, the water repellency angle was maintained thereafter. Through this, it was shown that this coating can maintain strong water-repellent characteristics even in a case where mechanical abrasion is applied by an external force.

In a case of the polymer compound (PVDF-HpFBMA) of Comparative Example 2, which is a polymer compound containing only fluorine-based acrylic monomers and no cationic monomers, the water contact angle was maintained in a case where polishing was carried out by applying a load of 75 g. However, after 20 times of polishing, the film peeled off quickly, and the water contact angle decreased exponentially in a case where polishing was carried out by applying a load of 100 g.

In the case of the polymer compound (PVDF-HpFBMA) of Comparative Example 2 which contains only fluorine-containing monomers, it is expected that since the material itself has a low surface energy and a low substrate adhesiveness, the film is quickly separated from the substrate in a case where friction is applied, which causes the substrate to be exposed and causes the sample to lose the hydrophobicity.

On the other hand, since the polymer compound (PVDF-HpFBMA-QDMA) of Example 1 further contains a cationic monomer, it interacts with the hydrophilic group on the surface of the metal or glass substrate, which strengthens the adhesiveness between the coating and the substrate and limits the damage to the film even being subjected to polishing. Through this, the mechanical durability of the polymer compound can be improved.

<Experimental Example 4> Evaluation of Air Permeability (Facial Area Breathing Resistance) of Spray Polymer Coating As an example of use of the present invention, use as a coating agent for an outer surface of a quarantine mask is presented.

In order for a grade to be given under public certification, the quarantine mask should satisfy various standards such as dust collection efficiency, leakage rate, and facial area breathing resistance, which are presented by each country/organization. In the present invention, a case where an N95 raw fabric is subjected to coating is given as an example. The dust collection efficiency is determined by the raw fabric, and the leakage rate is determined by the mask design. The facial area breathing resistance is affected not only by the characteristics of the raw fabric itself but also by the coating film applied to the outer surface.

To evaluate air permeability, an Aura 9205+N95 mask, manufactured by 3M Company, was used. The breathing resistance was measured for an uncoated mask and masks of which the outer surface had been subjected to coating once, twice, three times, and five times, respectively, under the condition B described above.

Figure 6:
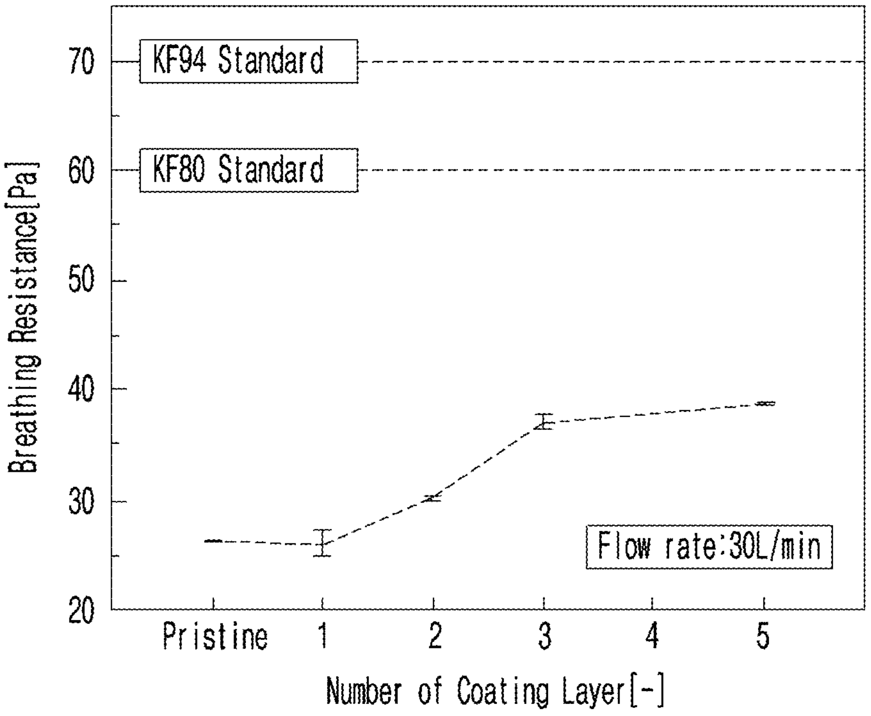
FIG. 6 shows the results obtained by evaluating air permeability with respect to a mask coated with a coating agent containing a polymer compound according to one embodiment.

The mask was worn on a test throat, and then a difference in pressure between the front and back of the mask was measured in a case where air was allowed to pass through at a flow rate of 30 L/min. The differential pressure was set to the average value measured for 60 seconds, and taping was carried out to prevent leakage in a case where the mask was worn on the test throat. Each sample was subjected to measurements of a total of four times, and the results are shown in FIG. 6.

As shown in Table 6, it can be seen that although the breathing resistance gradually increases until the third coating, it converges to about 38 Pa thereafter. The above results are results that satisfy the KF94 and KF80 standards specified by the Ministry of Food and Drug Safety, Korea, and they indicate that there is no trouble in breathing even in a case where the mask is coated.

The invention claimed is:

1. An antibacterial polymer composition comprising a polymer compound in which a cationic monomer containing a vinyl group and a quaternary ammonium group and fluorine-based acrylic monomer are graft-polymerized in polyvinylidene fluoride-co-chlorotrifluoroethylene (PVDF-co-CTFE), wherein the antibacterial polymer composition is characterized in that a content ratio of the cationic monomer to the fluorine-based acrylic monomer is 4% by weight:96% by weight to 20% by weight:80% by weight.

2. The antibacterial polymer composition according to claim 1, wherein the antibacterial polymer composition is characterized in that the quaternary ammonium group is one or more selected from the group consisting of a quaternary alkylammonium group, a pyridinium group, and an imidazolium group.

3. The antibacterial polymer composition according to claim 1, wherein the antibacterial polymer composition is characterized in that the cationic monomer is a monomer which is produced by subjecting a monomer to a reaction for a quaternary ammonium, the monomer being one or more selected from the group consisting of 2-dimethylaminoethyl methacrylate, 3-methylaminopropyl methacrylate, 2-vinylpyridine, and 4-vinylpyridine.

4. The antibacterial polymer composition according to claim 1, wherein the antibacterial polymer composition is characterized in that a content of chlorotrifluoroethylene in the polyvinylidene fluoride-co-chlorotrifluoroethylene (PVDF-co-CTFE) is 9% by weight to 21% by weight.

5. The antibacterial polymer composition according to claim 1, wherein the antibacterial polymer composition is characterized in that the fluorine-based acrylic monomer is a methacrylic acid ester monomer in which 3 or more hydrogen atoms are substituted with a fluorine atom.

6. The antibacterial polymer composition according to claim 1, wherein the antibacterial polymer composition is characterized in that the fluorine-based acrylic monomer is selected from the group consisting of trifluoroethyl methacrylate, tetrafluoropropyl methacrylate, octafluoropentyl methacrylate, tetrafluoroethyl methacrylate, hexafluorobutyl methacrylate, and heptafluorobutyl methacrylate.

7. The antibacterial polymer composition according to claim 1, wherein the antibacterial polymer composition is characterized in that a graft ratio of the polymer compound is 10% by weight to 70% by weight.

8. A production method for an antibacterial polymer composition according to claim 1, comprising:

a step of producing a polymerization solution containing polyvinylidene fluoride-co-chlorotrifluoroethylene (PVDF-co-CTFE), a cationic monomer containing a vinyl group and a quaternary ammonium group, a fluorine-based acrylic monomer, a metal catalyst, a ligand, and a polar aprotic solvent (step 1); and a step of carrying out a polymerization reaction using the polymerization solution to produce a polymer compound that is obtained by subjecting a cationic monomer and a fluorine-based acrylic monomer to graft polymerization (step 2).

9. The production method for an antibacterial polymer composition according to claim 8, wherein the production method is characterized in that the metal catalyst is monovalent copper chloride or monovalent copper bromide.

10. The production method for an antibacterial polymer composition according to claim 8, wherein the production method is characterized in that the ligand is one selected from the group consisting of 2,2-bipyridine, pentamethyldiethylenetriamine, and 4,4-dimethyldipyridyl.

11. The production method for an antibacterial polymer composition according to claim 8, wherein the production method is characterized in that the polar aprotic solvent is one or more selected from the group consisting of dimethyl sulfoxide, N-methyl 2-pyrrolidone, and dimethylformamide.

12. A coating agent comprising a polymer compound in that a cationic monomer containing a vinyl group and a quaternary ammonium group and a fluorine-based acrylic monomer are graft-polymerized in polyvinylidene fluoride-co-chlorotrifluoroethylene (PVDF-co-CTFE), wherein the polymer compound is characterized in that a content ratio of the cationic monomer to the fluorine-based acrylic monomer is 4% by weight:96% by weight to 20% by weight:80% by weight.

13. The coating agent according to claim 12, wherein the coating agent is characterized in that the coating agent is obtained by spray coating.

14. A spray coating method for an antibacterial polymer composition, the spray coating method comprising:

a step of dissolving the antibacterial polymer composition according to claim 1 in an organic solvent (step 1'); and a step of spraying the dissolved solution (step 2').

15. The spray coating method according to claim 14, wherein the spray coating method is characterized in that the organic solvent is selected from the group consisting of acetone, methyl ethyl ketone (MEK), methyl acetate, methylene chloride, benzene, methyl alcohol, and tetrahydrofuran.

* * * * *